(12) United States Patent
Okazaki

(10) Patent No.: US 7,113,697 B2
(45) Date of Patent: Sep. 26, 2006

(54) DISPLACEMENT DETECTION DEVICE AND LENS BARREL

(75) Inventor: Mitsuhiro Okazaki, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 115 days.

(21) Appl. No.: 10/493,600

(22) PCT Filed: Nov. 6, 2002

(86) PCT No.: PCT/JP02/11560

§ 371 (c)(1),
(2), (4) Date: Apr. 26, 2004

(87) PCT Pub. No.: WO03/040661

PCT Pub. Date: May 15, 2003

(65) Prior Publication Data

US 2005/0008359 A1    Jan. 13, 2005

(30) Foreign Application Priority Data

Nov. 6, 2001    (JP)    ............................. 2001-340298

(51) Int. Cl.
*G03B 17/00* (2006.01)
*G01B 7/30* (2006.01)

(52) U.S. Cl. .................... 396/87; 396/133; 324/207.21; 324/207.25; 341/15

(58) Field of Classification Search ................ 396/87, 396/133; 359/823; 324/207.21, 207.25; 341/15
See application file for complete search history.

(56) References Cited

U.S. PATENT DOCUMENTS 5,146,071 A * 9/1992 Ookubo et al. .......... 250/201.2
5,859,733 A * 1/1999 Miyano et al. ............. 359/824
6,263,163 B1 * 7/2001 Sasaki et al. ................. 396/79

FOREIGN PATENT DOCUMENTS

| JP | A 2-236120 | 9/1990 |
| JP | U 4-127506 | 11/1992 |
| JP | A 7-128566 | 5/1995 |
| JP | A 7-324946 | 12/1995 |
| JP | A 2000-205808 | 7/2000 |
| JP | A 2001-330470 | 11/2001 |

* cited by examiner

*Primary Examiner*—W. B. Perkey
(74) *Attorney, Agent, or Firm*—Oliff & Berridge PLC

(57) ABSTRACT

A displacement detection device which detects a displacement of a movable member which is provided so as to be displaceable with respect to a fixed member, comprises: a scale that is provided as a unit with the movable member; a displacement detection section that detects a displacement of the scale; a support member that supports the displacement detection section in a state in which the displacement detection section is able to shift in a direction which is substantially perpendicular to a contact plane where the displacement detection section contacts with the scale at a contact position between the displacement detection section and the scale and in which shifting in a direction other than the direction substantially perpendicular to the contact plane is restricted; and a pressure application member that applies a pressure to the displacement detection section towards the scale.

17 Claims, 8 Drawing Sheets

(a)

(b)

(a)

(b)

(a)

(b)

DISPLACEMENT DETECTION DEVICE AND LENS BARREL

The present invention is based upon Japanese Patent Application 2001-340298 filed upon Nov. 6, 2001, and hereby incorporates the content thereof by reference.

TECHNICAL FIELD

The present invention relates to a displacement detection device which detects a displacement of a movable member and to a lens barrel which comprises the displacement detection device.

BACKGROUND ART

With many mechanical devices, the displacement and the speed of a movable member have been detected minutely as information for performing feedback control or the like in recent years. For example, with a lens barrel of an auto focus camera, a focus cam mechanism is provided internally which converts the rotational drive force of an electric motor or the like into a linear drive force, so as to shift the focusing lens. In Japanese Laid-Open Patent Publication No. 2000-205808, there is disclosed a displacement detection device which detects the rotational displacement of a rotating tube included in such a focusing cam mechanism which is provided to this type of lens barrel.

This related art device comprises a magnetic pattern which is disposed upon the exterior peripheral surface of the lens barrel along its circumferential direction, and a magnetoresistive sensor (MR sensor) which is made to contact with the magnetic pattern in order to detect the rotational position of the movable barrel. The MR sensor is supported in a holder, and is biased or pressed via the holder towards the magnetic pattern by the spring force of a pressure spring. It is arranged that the MR sensor is capable of swinging with respect to the pressure spring.

However, with this type of related art device, since it is necessary for the holder to be held by the pressure spring with a certain degree of freedom, accordingly there is a problem of deterioration of detection accuracy being caused due to the occurrence of play between the pressure spring and the holder.

DISCLOSURE OF THE INVENTION

The present invention provides a displacement detection device, a lens barrel, and a camera, with which a scale can be read accurately.

A displacement detection device according to the present invention, which detects a displacement of a movable member which is provided so as to be displaceable with respect to a fixed member, comprises: a scale that is provided as a unit with the movable member; a displacement detection section that detects a displacement of the scale; a support member that supports the displacement detection section in a state in which the displacement detection section is able to shift in a direction which is substantially perpendicular to a contact plane where the displacement detection section contacts with the scale at a contact position between the displacement detection section and the scale and in which shifting in a direction other than the direction substantially perpendicular to the contact plane is restricted; and a pressure application member that applies a pressure to the displacement detection section towards the scale.

It is preferable that the support member is formed as a thin plate member with an elastic characteristic. It is preferable that one end of the support member is fixed to the fixed member, and another end of the support member supports the displacement detection section. It is preferable that the support member is arranged so that a longitudinal direction thereof extends along a direction of shifting of the scale.

It is preferable that the pressure application member applies the pressure substantially in a center of the contact position of the displacement detection section.

It is preferable that a portion of the scale which contacts with the displacement detection section is a tube surface, and that the support member is provided on the contact plane or in the vicinity of the contact plane, and is arranged substantially parallel with the contact plane.

The support member may comprise a rigidity reduction section at a portion of the support member which bends when the displacement detection section shifts in the direction substantially perpendicular to the contact plane. It is preferable that the rigidity reduction section is provided in the vicinity of a substantial center of the support member. The rigidity reduction section may be a hole portion which is provided in the support member.

It is preferable that the pressure application member does not apply force to the displacement detection section and does not restrict a position of the displacement detection section in a direction other than a pressure application direction in which the pressure application member applies the pressure to the displacement detection section towards the scale. It is also preferable that the pressure application member is arranged so that a longitudinal direction thereof extends along a direction of shifting of the scale.

It is desirable that the scale is a magnetic scale whose different magnetic polarities are arranged alternatingly along a shifting direction, and that the displacement detection section comprises a magnetoresistive sensor that detects a magnetism of the magnetic scale. The displacement detection section may include a gap regulation member that regulates a gap between the magnetoresistive sensor and the magnetic scale, and the gap regulation member may be provided on a side of the magnetoresistive sensor which faces the magnetic scale.

The displacement detection section may comprise a convex portion at a portion thereof to which the pressure is applied by the pressure application member.

A lens barrel according to the present invention, comprises: a photographic optical system; a fixed member that is to be fitted to a photographic device main body; and a displacement detection device according to any one of claims 1 through 14, wherein: the displacement detection device detects a displacement of a movable member that rotates with respect to the fixed member to drive at least a portion of the photographic optical system.

A camera according to the present invention comprises: a camera main body, and a lens barrel according to claim 15.

BRIEF DESCRIPTION OF THE DRAWINGS

FIG. 6(a) is a figure showing a support plate in the first embodiment, while FIG. 6(b) is a figure showing a support plate in the second embodiment.

BEST MODE FOR CARRYING OUT THE INVENTION

First Embodiment

In the following, a displacement detection device and a lens barrel according to the first embodiment of the present invention will be described in detail.

Figure 1:
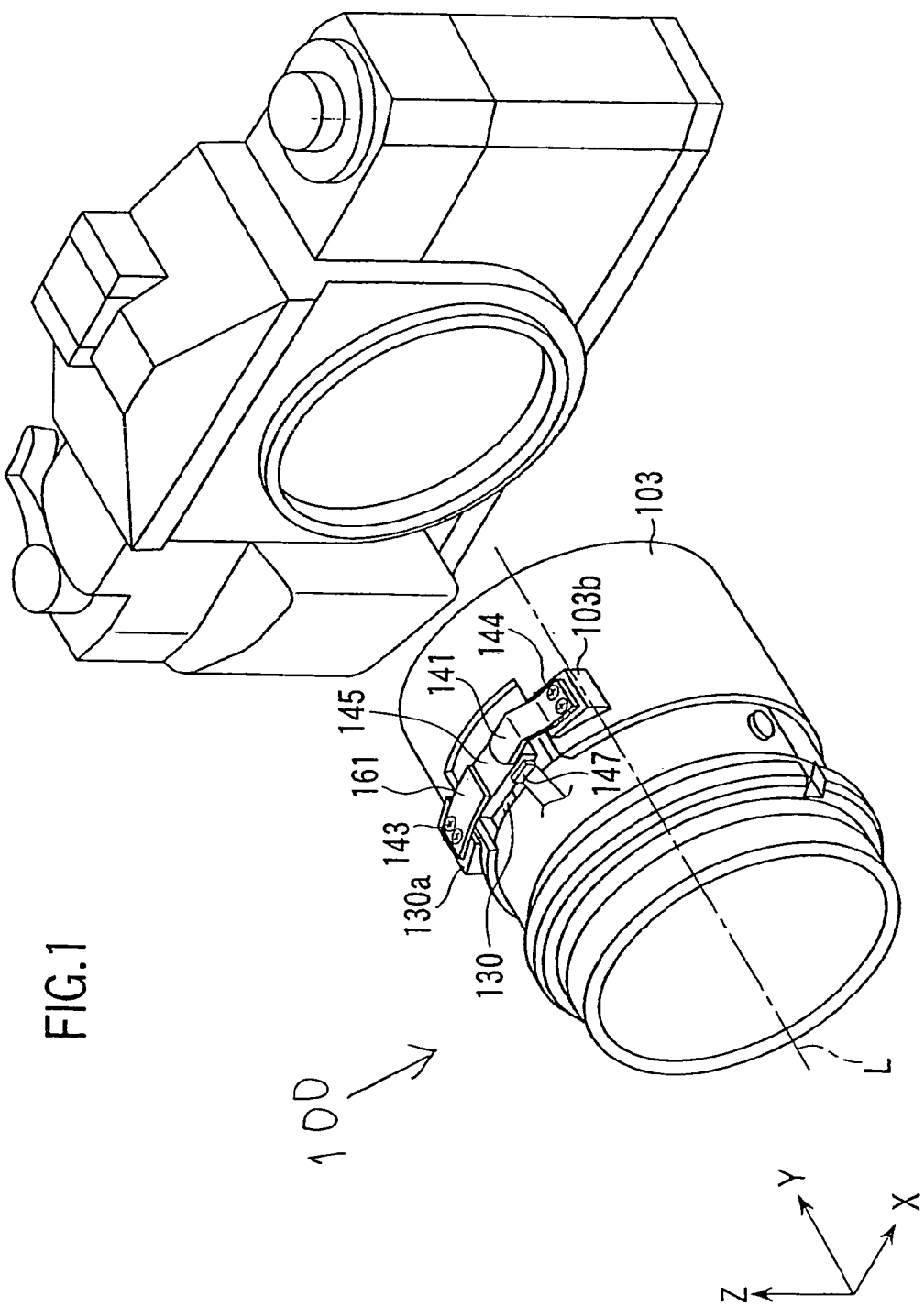
FIG. 1 is a perspective view of a lens barrel which is provided with a displacement detection device according to a first embodiment of the present invention.
Figure 2:
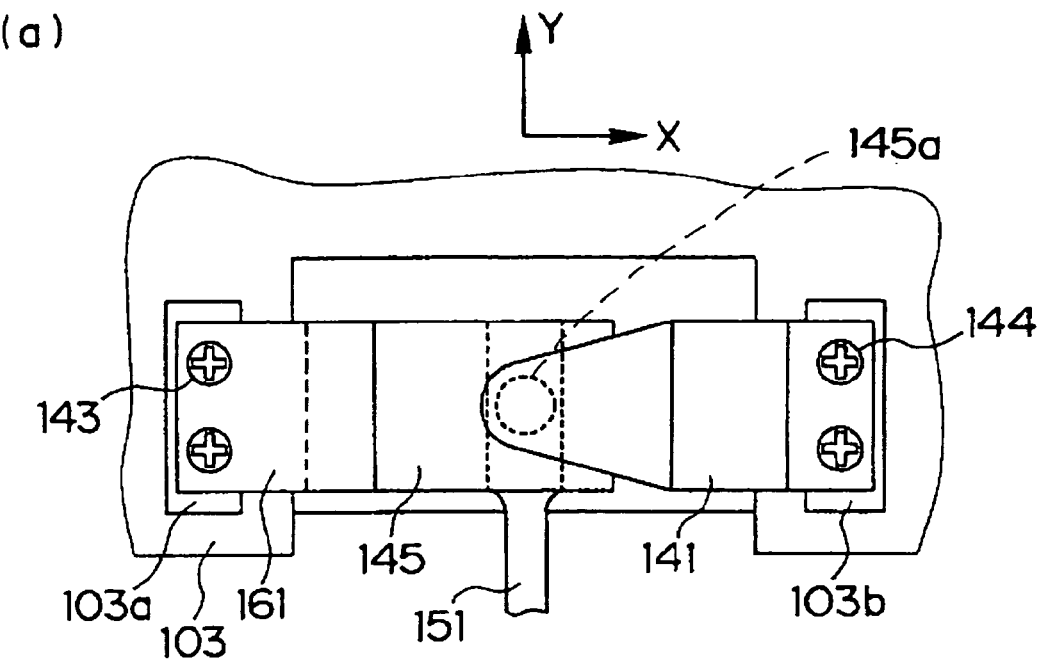
FIGS. 2(*a*) and 2(*b*) are figures showing the displacement detection device according to the first embodiment.
Figure 2:
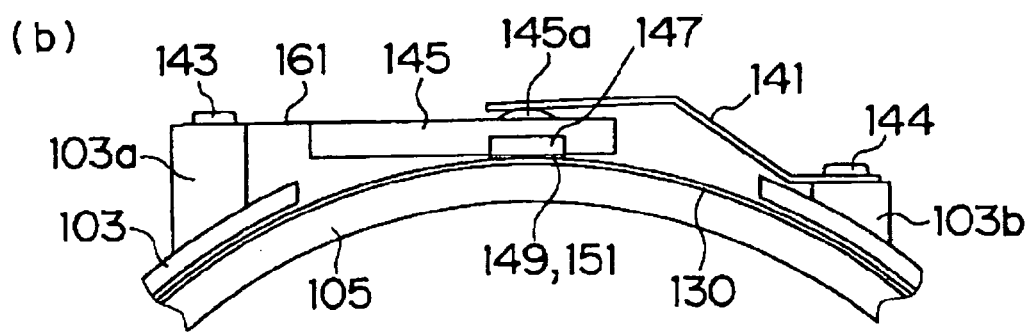

FIG. 1 is a perspective view showing a lens barrel 100 which is equipped with a displacement detection device according to the first embodiment of the present invention. And FIGS. 2(a) and 2(b) are figures showing this displacement detection device according to the first embodiment. FIG. 2(a) is a figure showing the displacement detection device from the outer peripheral side of the lens barrel 100, while FIG. 2(b) is a figure showing its appearance as observed from the side of a subject to be photographed (the −Y axis direction). It should be understood that for a purpose of illustration a coordinate system is provided which consists of an X axis, a Y axis, and a Z axis, as shown in FIGS. 2(a) and 2(b). In the following, the same coordinate system will be used for FIGS. 1 through 5. Moreover, it should be understood that the lens barrel 100 is fitted to a camera main body by a bayonet mount or the like which is not shown in the figures, so that the +Y axis direction is towards the camera main body.

A displacement detection device according to the first embodiment of the present invention is provided to the lens barrel 100 of the camera, and is a magnetic encoder which detects displacement of a rotating tube 105 which rotationally shifts relative to a fixed tube 103. The displacement detection device comprises a scale 130, a MR sensor 147, a holder 145, a pressure spring 141, a support plate 161, a spacer film 149, a flexible printed circuit 151, and the like.

The fixed tube 103 has a bayonet mount, and is a fixed member which is fixed to the camera main body via this bayonet mount. This fixed tube 103 also comprises a seat 103a for fixing a support plate 161 which will be described hereinafter, and a seat 103b for fixing the pressure spring 141.

The rotating tube 105 is rotatable with respect to the fixed tube 103, and is a movable member which rotates by receiving drive force from a drive source not shown in the drawings and moves a lens group not shown in the figures through a cam mechanism or the like.

The scale 130 is fixed by adhesion against the outer peripheral surface of the rotating tube 105, and is a magnetic scale upon which a scale is provided by magnetization along its circumferential direction. At the scale 130 magnetic poles of different polarity are arranged alternatingly along the shifting direction of the scale 130.

The MR sensor (magnetoresistive sensor) 147 is a detection element main body which is adhered to the holder 145 and which detects the magnetism of the scale 130.

Figure 3:
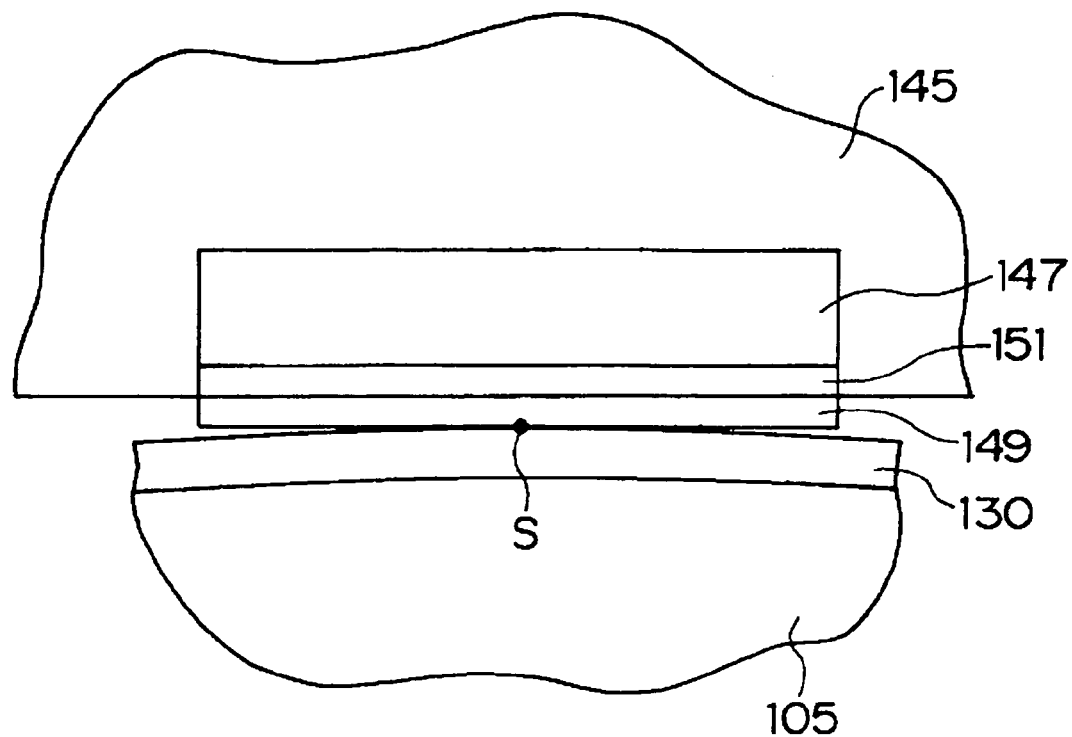
FIG. 3 is an enlarged view showing the surroundings of an MR sensor.
Figure 3:
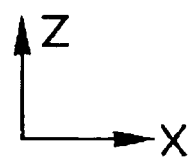

FIG. 3 is an enlarged figure showing the vicinity of the MR sensor 147 shown in FIG. 2(b). The flexible printed circuit 151 is connected to the MR sensor 147, and is made so that the magnetic signal which is detected by the MR sensor 147 is transmitted to a lens CPU not shown in the figures. This lens CPU calculates the rotational displacement of the rotating tube 105 based upon this magnetic signal.

The spacer film 149, which has a low coefficient of friction, is stuck to the scale 130 side of the MR sensor 147 and the flexible printed circuit 151. Due to this it is ensured that, when the MR sensor 147 is properly contacted against the scale 130, the gap between them both is set to the most appropriate gap. As shown in FIG. 3, the contact position when the scale 130 and the spacer film 149 are properly contacted together is called "S".

The holder 145, along with holding the MR sensor 147, also is supported by the support plate 161. This holder 145 is provided with a spherical convex portion 145a upon its opposite side from its portion which supports the MR sensor 147, in other words upon its +Z side.

It should be understood that the holder 145, the MR sensor 147, the spacer film 149, and the flexible printed circuit 151 and so on constitute a displacement detection section.

The pressure spring 141 is a pressure application member which applies pressure to the holder 145 and the MR sensor 147 towards the scale 130. At its one end, this pressure spring 141 is fixed by screws 144 to the seat 103b, and, at its other end, it contacts the convex portion 145a, thereby applying pressure to the holder 145 and the MR sensor 147 with respect to the scale 130. Accordingly, this pressure spring 141 does not apply any force to the holder 145 and the MR sensor 147 in any direction other than this direction of pressing the holder 145 and the MR sensor 147 towards the scale 130 (i.e. the −Z direction). Furthermore, the pressure spring 141 does not restrict the position of the holder 145 and the MR sensor 147 in any direction other than the Z direction.

The support plate 161 is made of an elastic material which is of very thin plate shape and it is a support member which supports the holder 145. In this embodiment, the support plate 161 and the holder 145 are fixed to each other with adhesive.

When a plane parallel to the XY plane, i.e. perpendicular to the Z axis, which passes through the position S in which the spacer film 149 contacts the scale 130 is taken as a contact plane, the support plate 161 is arranged substantially parallel to this contact plane. One end of this support plate 161 is fixed to the seat 103a of the fixed tube 103 by screws 143, while its other end is fixed to the holder 145.

Although this support plate 161 is made of an elastic material, it does not generate any pressing force (i.e. it is not bent and thus a spring force is not generated) in the situation in which the MR sensor 147 is contacted against the scale 130 in the correct position.

Since the support plate 161 is made of a thin plate shaped material, it affords almost no support in the direction (the Z axis direction) which is substantially perpendicular or orthogonal to the contact plane. Accordingly, the holder 145 can be shifted in the Z axis direction by a small force. On the other hand, since the rigidity of the support plate 161 in directions within the contact plane is high compared to its rigidity in the Z axis direction, so that it is difficult for the support plate 161 to be deformed in those directions, accordingly the secure support of the holder 145 in directions within the contact plane is assured.

As shown in FIGS. 2(*a*) and 2(*b*), the seat 103*b* to which the pressure spring 141 is fixed and the seat 103*a* to which the support plate 161 is fixed are separated from each other and are disposed on either side (the +X side and the −X side) of the MR sensor 147. Furthermore, the longitudinal directions of the pressure spring 141 and the support plate 161 are arranged to lie in the direction along the shifting direction of the scale 130, in other words of the rotating tube 105. In this manner, the longitudinal directions of the pressure spring 141 and the support plate 161 are arranged to be disposed so as to be approximately orthogonal to the direction of the optical axis L, and thereby it is possible to reduce the size or extent of the device along the direction of the optical axis L (the Y axis direction).

As has been explained above, according to this first embodiment, the holder 145 is supported by the support plate 161, and the pressure is applied by the pressure spring 141. By doing this, it is ensured that the MR sensor 147 does not tilt with respect to the scale 130, so that it is possible to obtain a sufficiently great detection signal.

Since the MR sensor 147 is fitted so as to have no play, it is possible to read out the scale 130 accurately.

Since the shapes of the components, such as the pressure spring 141 and the support plate 161, are made to be simple, accordingly it is possible to manufacture these components easily, with high accuracy, and moreover at low cost.

Second Embodiment

Figure 4:
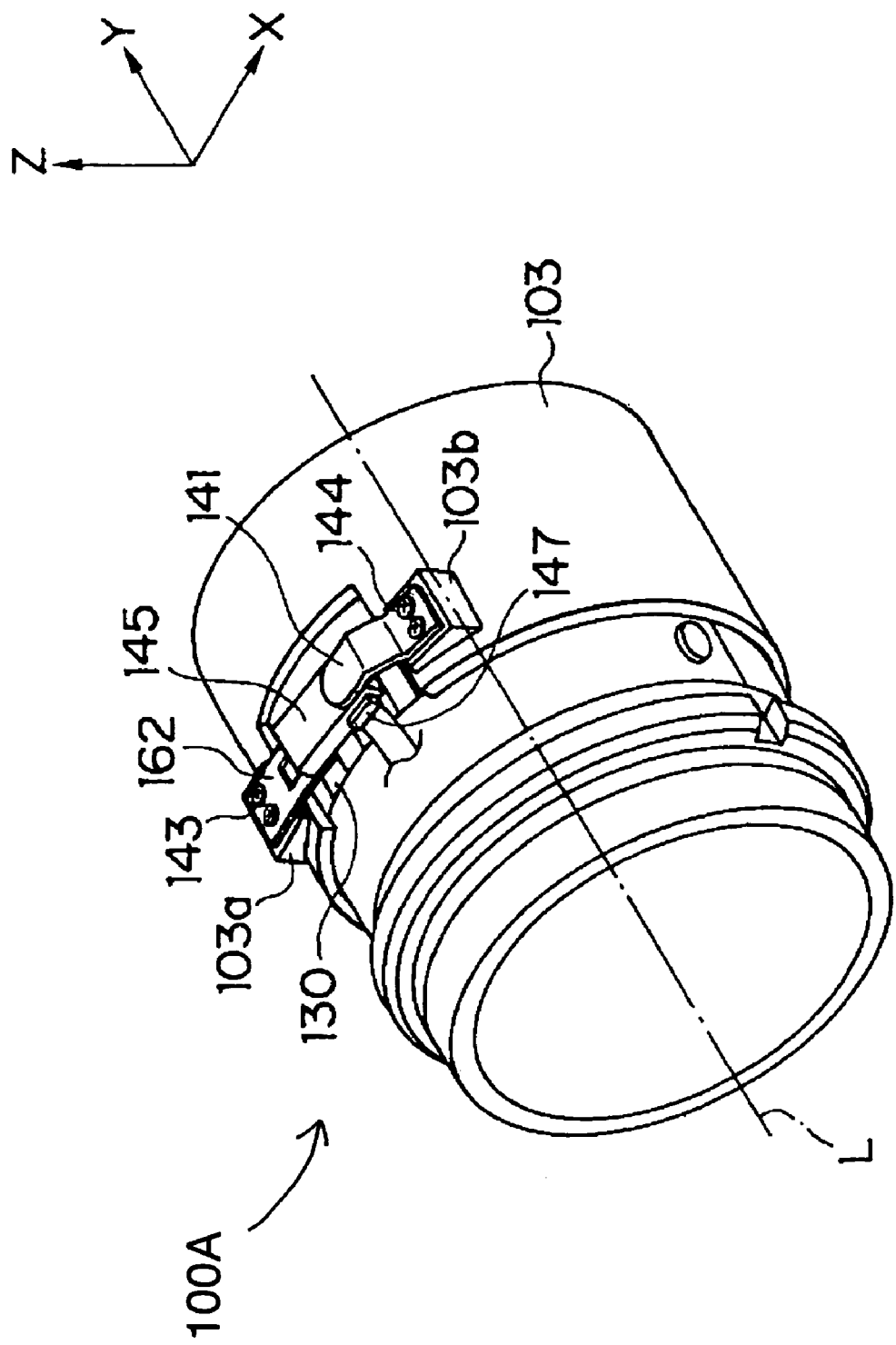
FIG. 4 is a perspective view of a lens barrel which is provided with a displacement detection device according to a second embodiment of the present invention.
Figure 5:
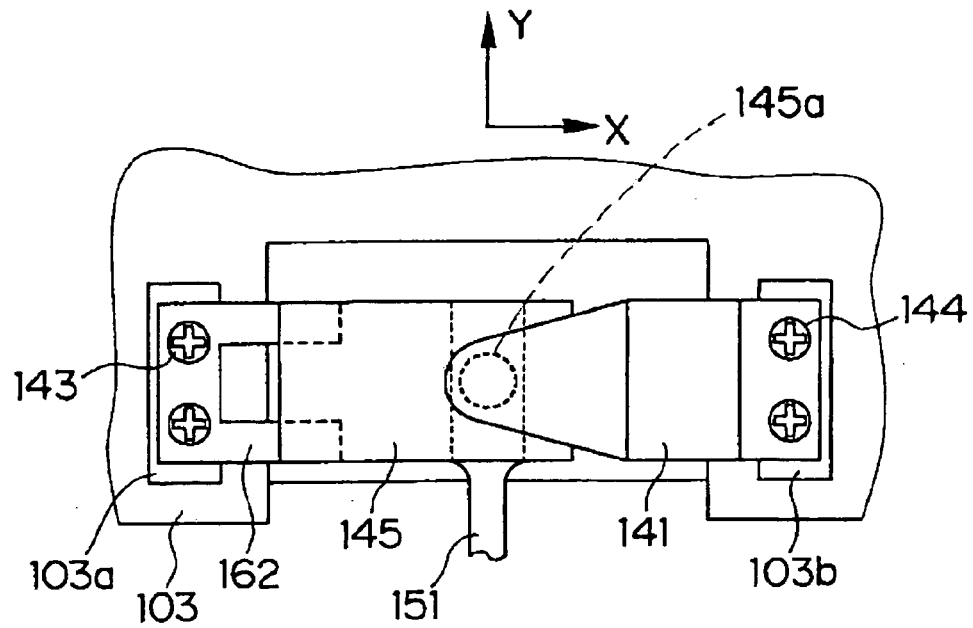
FIGS. 5(a) and 5(b) are figures showing the displacement detection device according to the second embodiment.
Figure 5:
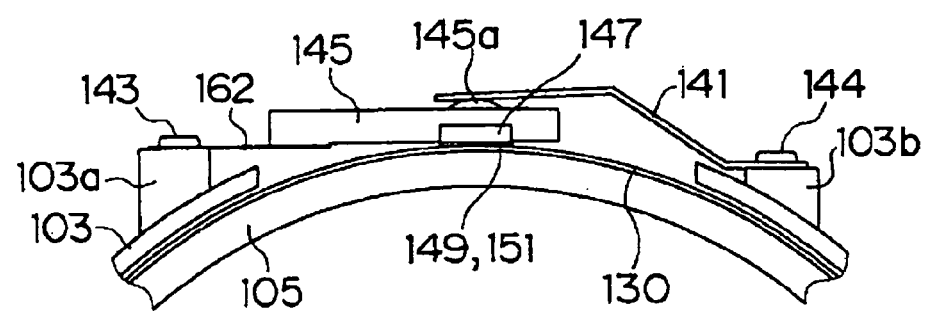
Figure 5:
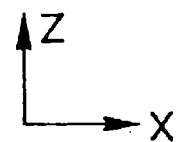

FIG. 4 is a perspective view showing a lens barrel 100A which is equipped with a displacement detection device according to the second embodiment of the present invention. FIG. 5(*a*) is a figure showing the displacement detection device according to this second embodiment as seen from the outer peripheral side of the lens barrel 100A, while FIG. 5(*b*) is a figure showing this displacement detection device as seen from the side of a subject to be photographed.

In FIGS. 4, 5(*a*), and 5(*b*), to portions which correspond to portions which have the same functions as ones in FIGS. 1, 2(*a*), and 2(*b*), the same reference symbols are appended. In this displacement detection device according to the second embodiment, in place of the support plate 161 of the first embodiment discussed above, there is provided a support plate 162 whose shape and arrangement have been altered. Here, the explanation will focus upon the features which differs from the first embodiment described above.

Figure 6:
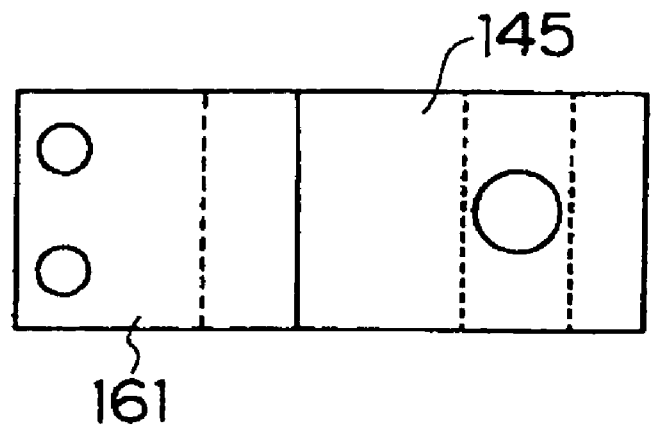
Figure 6:
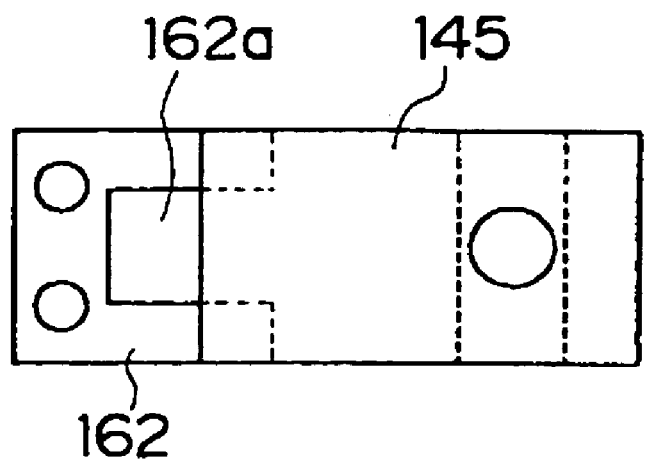

FIG. 6(*a*) is a figure showing a plan view of the support plate 161 of the first embodiment, while FIG. 6(*b*) is a figure showing a plan view of the support plate 161 of this second embodiment. As shown in FIG. 6(*a*), the support plate 161 is made in a thin plate shape with an elastic characteristic, and the holder 145 is arranged below the support plate 161. As shown in FIG. 6(*b*), the support plate 162 is formed in an elastic thin plate shape and has a hole portion 162*a* pierced through it, and the holder 145 is arranged above the support plate 162.

Since the support plate 161 of the first embodiment offered almost no support in the directions approximately orthogonal to the contact plane (the Z axis direction) as described above, accordingly the holder 145 could be shifted in the Z axis direction by a small force. Thus, when the rotating tube 105 turned, sometimes an undulation was set up due to the manufacturing inaccuracy of components constituting the rotating tube 105 and the like, so that the contact position S wobbled in the Z axis direction.

It has been considered to make the applied pressure force (the pressing force) of the pressure spring 141 larger, so as to enable the holder 145 accurately to follow the rotating tube 105, in other words the scale 130, even if an undulation has been set up by the rotation of the rotating tube 105. However, when the pressure force which is applied by the pressure spring 141 becomes great, the sliding resistance between the scale 130 and the MR sensor 147 becomes great, and this can become an obstacle to the rotational driving of the rotating tube 105. In this connection, it is desirable to ensure that the following up characteristic of the holder 145 is excellent by making the support force in the Z axis direction due to the support plate 161 small.

In this connection, as shown in FIG. 6(*b*), the hole 162*a* is provided in the central portion of the width (the Y axis direction) of the support plate 162, and thereby the rigidity of the support plate 162 is reduced, so that the support force in the Z axis direction is reduced.

Figure 7:
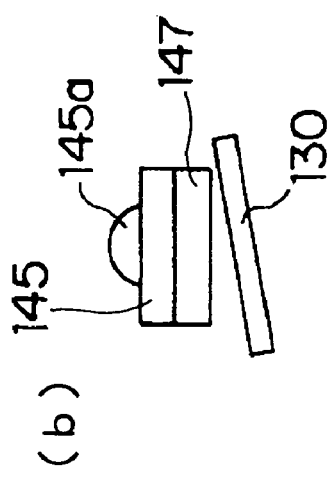
FIGS. 7(a) through 7(d) are figures showing the contact situation between a holder and a scale.
Figure 7:
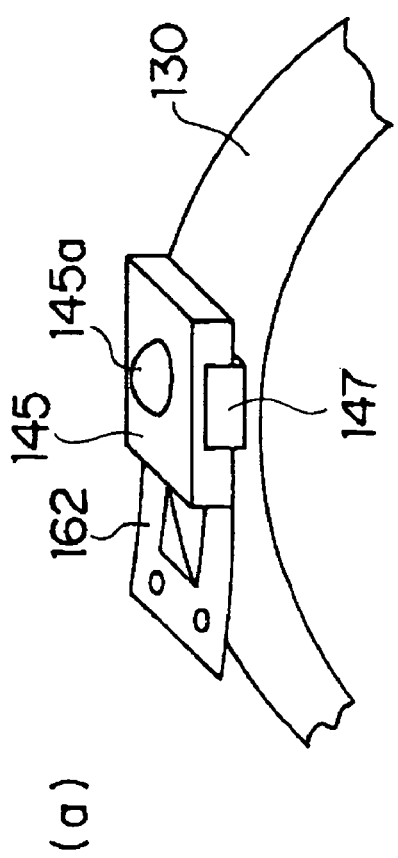
Figure 7:
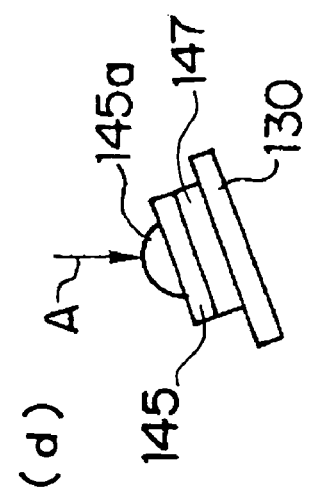
Figure 7:
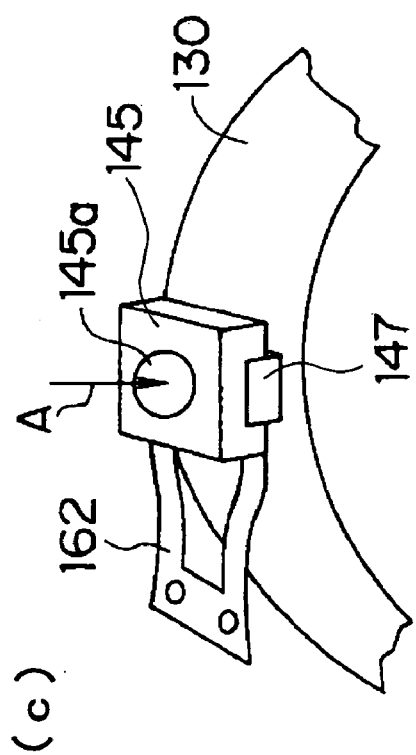

FIGS. 7(*a*) through 7(*d*) are figures showing the contact situation between the holder 145 and the scale 130 with the tilt therebetween exaggerated. It should be understood that the spacer film 149 and the flexible printed circuit 151 and so on have been omitted from these figures for sake of clarity.

As shown in FIGS. 7(*a*) and 7(*b*), if tilting of the rotating tube 105 occurs due to the influence of manufacturing inaccuracies or the like, then the MR sensor 147 may come to contact with the scale 130 only partially with relation to the widthwise direction of the scale 130, in other words the shifting direction of the rotating tube 105, which is undesirable. At this time, as shown in FIGS. 7(*c*) and 7(*d*), the support plate 162 is deformed in a twisting manner when pressure is applied as shown by the arrow A to the approximate center of the MR sensor 147, in other words the approximate center of the contact position S (refer to FIG. 3) where the MR sensor 147 and the scale 130 are properly contacted with each other. Due to this, it is possible for the MR sensor 147 to be tightly in contact with the scale 130, as shown in FIG. 7(*d*).

As shown in FIGS. 5(*a*) and 5(*b*), in this embodiment, a spherical convex portion 145*a* is arranged in a position which corresponds to the approximate center of the MR sensor 147, in other words to the approximate center of the contact position S between the MR sensor 147 and the scale 130. By the pressure spring 141 applying pressure to this spherical convex portion 145*a*, it is possible to apply pressure to the approximate center of the contact position S of the MR sensor 147.

As has been described above, the hole 162*a* is provided in the bent portion of the support plate 162, so as to reduce the rigidity of the support plate 162 in the Z axis direction. By doing this, it is possible to shift the holder 145 along the Z axis direction with a smaller force so that the MR sensor 147 can be tightly and reliably in contact with the scale 130 with the spring force of the spring 141.

As shown in FIG. 6(*b*), the hole 162*a* is provided at the central portion of the support plate 162 in its widthwise direction (its Y axis direction). If only the rigidity of the support plate 162 were to be reduced, it would be simple to reduce the width of this plate (i.e. its length along the Y axis direction). However, it is necessary to hold the position of the holder 145 in the direction of the contact plane (i.e. in the X-Y plane) accurately even when the resistance to deformation of the support plate 162 in the Z axis direction is reduced. Thus, in this second embodiment, by providing the hole 162*a* in the central portion of the support plate 162, the rigidity in the direction of the contact plane is not greatly deteriorated, while the bending rigidity in the Z axis direction is effectively reduced. Furthermore, due to the provision of the hole 162a, the beneficial result is also obtained that the torsional rigidity of the support plate 162 is reduced.

As shown in FIG. 5(b), the position in which the support plate 162 is fitted is different from that of the support plate in the first embodiment; it is provided in a position virtually on the contact plane. Due to this, the holder 145 is provided on the +Z axis side of the support plate 162, and is arranged so as to be sandwiched between the support plate 162 and the pressure spring 141.

Figure 8:
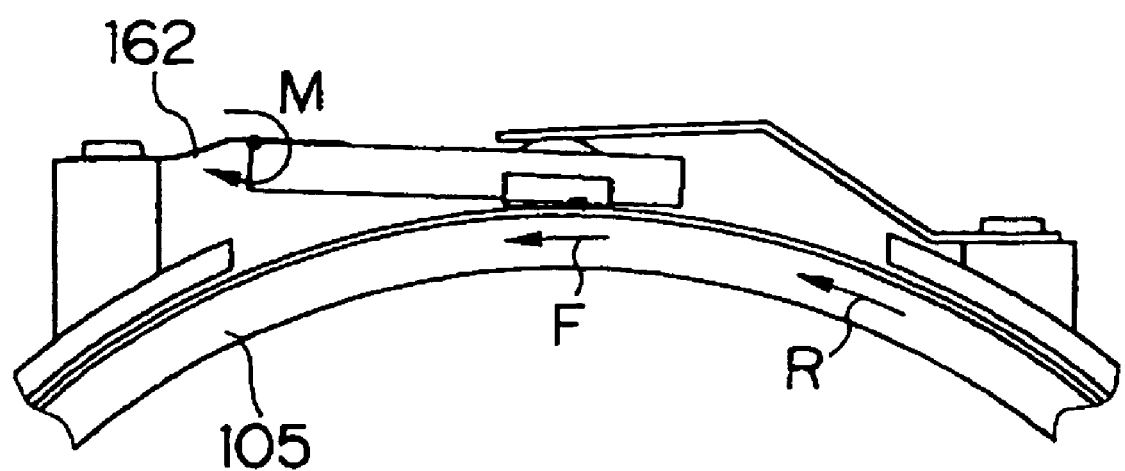
FIG. 8 is a figure for explanation of the case in which the support plate of the second embodiment is provided in a position which is identical to that of the support plate in the first embodiment.

FIG. 8 is a fictitious figure for explanation of a hypothetical case in which the support plate 162 of the second embodiment has been provided in the same position as was the support plate 161 of the first embodiment. The support plate 162 of this second embodiment, as explained above, always has less rigidity in the Z axis direction. Let us tentatively suppose that, the support plate 162 were to be arranged as shown in FIG. 8 with the holder 145 being disposed upon the −Z side of the support plate 162. In such a case, when the rotating tube 105 rotated in the direction of the arrow R in the figure, the bending moment M which acted upon the support plate 162 due to the frictional force F at the contact position S would become large. Due to this, the support plate 162 might be deformed, which would be undesirable. However, the actual situation with the second embodiment is that, since the support plate 162 is provided in a position which is approximately on the contact plane, the bending moment becomes small and also it is possible to prevent the occurrence of deformation.

As has been explained above, since, according to this second embodiment, the hole 162a is provided in the support plate 162, accordingly it is possible for the holder 145 to shift in the Z direction under a lighter force. Due to this, it is possible to enhance the following characteristic of the holder 145 even if undulations of the scale 130 or the like should occur, without making the pressing force of the pressure spring 141 any greater, and thus it is possible to read the scale 130 more accurately through the MR sensor 147.

Since the support plate 162 is provided in a position which comes to be approximately on the contact plane, the bending moment which acts upon the support plate 162 due to the rotation of the rotating tube 105 becomes small. Due to this, it is possible to prevent undesirable deformation of the support plate 162, even though the bending rigidity of the support plate 162 due to the provision of the hole 162 therein is reduced.

Variant Embodiments

Although the displacement detection device and the lens barrel of the present invention have been explained above in terms of first and second embodiments thereof, they should not be considered as being limited by the details of these embodiments; various changes to the form and content of any particular embodiment are possible, and these variants are also to be considered as falling within the scope of the present invention.

For example while, in the above described embodiments, as an example, the method shown for fixation of the support plates 161 and 162 and the holder 145 was by way of adhesion, it is not limited to this method; for example, it would also be acceptable to utilize thermal caulking, insert molding, or some other fixing method.

Moreover although, by way of example, in the second embodiment, it was described that the hole 162a was provided in the support plate 162, and moreover that the support plate 162 was provided in a position which was approximately on the contact plane, the present invention is not to be considered as being limited by these constructional details. For example, it would also be acceptable to arrange the support plate, with the hole 162a pierced through it, in the same position as in the first embodiment; or, conversely, it would also be acceptable to provide a support plate formed with no such hole 162a, in the same position approximately on the contact plane.

Although the spherical convex portion 145a was provided in the holder 145, it would also be acceptable, as an alternative, to utilize a convex portion which was formed as a polyhedron, provided that pressure was applied by the pressure spring 141 in the approximate center of the contact position of the MR sensor 147. Furthermore, it would also be possible to use a convex portion of which only a portion was formed in a spherical shape. Although, as shown in FIG. 5(a), due to the provision of the hole 162a, the support plate 162 is formed in a U shape, it would also be possible, as an alternative, to form the support plate 162 in a frame shape by providing a hole in its central portion.

Although the above described embodiments were described in terms of a displacement detection device which detected the magnetism of the scale 130 with the MR sensor 147, in other words in terms of a magnetic encoder, it would also be possible to utilize a displacement detection device in which a magnetic type scale was not used.

As has been explained above, with the displacement detection device according to the various embodiments of the present invention, the displacement detection section is supported so that the support plates 161 and 162 are able to shift in the direction which is approximately orthogonal to the contact plane, while their shifting in directions other than said direction which is approximately orthogonal to the contact plane is restricted. Due to this it is possible to obtain a sufficient detection signal, without the displacement detection section including the MR sensor 147, the spacer film 149, the flexible printed circuit 151 and the like tilting with respect to the scale 130. Furthermore, it is possible to read off the scale accurately without any play occurring.

Since the support plates 161 and 162 are made as thin plate members with an elastic characteristic, they are cheap to manufacture.

Since the support plates 161 and 162 are fixed at their one ends to the fixing section 103a, and support the holder 145 of the displacement detection section by their other ends, accordingly it is possible to make the support plates 161 and 162 of a simple structure.

Since the support plates 161 and 162 are arranged so that their longitudinal directions run along the direction of shifting of the scale 130, it is possible to take advantage of the available space effectively, and accordingly it is possible to make the displacement detection device more compact. In particular, it is possible to reduce its size in the direction of the optical axis L.

Since the pressure spring 141 applies pressure approximately in the center of the contact position of the displacement detection section, accordingly the support plates 161 and 162 deform in a twisting manner so that the displacement detection section follows the scale 130. Due to this, it is possible to enhance the degree of contact between the displacement detection section and the scale 130, thus making it possible to obtain an accurate detection value.

Since the support plates 161 and 162 are provided on the contact plane or in the vicinity of the contact plane, and are arranged as being approximately parallel to the contact plane, it is possible to prevent the support plates 161 and 162 from being deformed by the rotation of the rotating tube 105.

Since the support plate 162 comprises a rigidity reduction section at a portion which bends when the displacement detection section shifts in the direction approximately orthogonal to the contact plane, accordingly it is possible to enhance the following characteristic of the displacement detection section with respect to the scale 130. Since this rigidity reduction section is provided in the vicinity of the approximate center of the support plate 162, accordingly, along with reducing the rigidity in the direction which is substantially perpendicular to the contact plane, it is also possible reliably to hold the position of the contact plane direction. And, since the rigidity reduction section is the hole portion 162*a* which is provided in the support plate 162, accordingly it is easy and simple to construct.

Since the pressure spring 141 does not apply force to or restricts the position of the displacement detection section in any direction other than the pressure application direction in which the displacement detection section is pressed towards the scale 130, accordingly it is possible to maintain the position of the displacement detection section accurately.

Since the pressure spring 141 is arranged so that its longitudinal direction runs along the direction of shifting of the scale 130, accordingly it is possible to take efficient advantage of the available space, and therefore it is possible to make the displacement detection device more compact. In particular it is possible to reduce its size along the direction of the optical axis L.

Since the scale 130 is a magnetic scale of which the different magnetic poles are arranged alternatingly along the shifting direction, and the displacement detection section includes the magnetoresistive sensor 147 which detects the magnetism of this magnetic scale, accordingly it is possible to detect the displacement accurately. And, since the spacer film 149 is provided upon the portion of the magnetoresistive sensor 147 which faces the magnetic scale 130, accordingly it is possible to ensure the appropriate gap between the magnetoresistive sensor 147 and the magnetic scale 130, so that it is possible to perform the detection of displacement accurately.

Since the convex portion 145*a* is provided in the portion to which pressure is applied by the pressure spring 141 of the displacement detection section, accordingly it is possible for the displacement detection section to apply pressure effectively so as to follow along the scale 130.

As has been explained above, in the lens barrel according to the embodiments of the present invention, there are comprised a photographic optical system, the fixed tube 103 which is mounted to the photographic device main body, and the above described displacement detection device. This displacement detection device detects displacement of the movable tube 105 that rotates with respect to the fixed tube 103 so as to drive at least a portion of the photographic optical system. Due to this, along with it being possible accurately to detect the displacement of the movable tube 105, it is also possible to make the lens barrel particularly compact along the direction of the optical axis. It is also possible to make the camera itself more compact by fitting a lens barrel of the type described above to the camera main body.

INDUSTRIAL APPLICABILITY

Although in the above the displacement detection device of the present invention has been explained, by way of example, in terms of its application to a lens barrel, the present invention could also be applied, in the same manner, to any other device for which accuracy of detection of displacement of a movable member was required.

What is claimed is:

1. A displacement detection device which detects a displacement of a movable member which is provided so as to be displaceable with respect to a fixed member, comprising:
   a scale that is provided as a unit with the movable member;
   a displacement detection section that detects a displacement of the scale;
   a support member that supports the displacement detection section in a state in which the displacement detection section is able to shift in a direction which is substantially perpendicular to a contact plane where the displacement detection section contacts with the scale at a contact position between the displacement detection section and the scale and in which shifting in a direction other than the direction substantially perpendicular to the contact plane is restricted; and
   a pressure application member that applies a pressure to the displacement detection section towards the scale.

2. A displacement detection device according to claim 1, wherein:
   the support member is formed as a thin plate member with an elastic characteristic.

3. A displacement detection device according to claim 1, wherein:
   one end of the support member is fixed to the fixed member, and another end of the support member supports the displacement detection section.

4. A displacement detection device according to claim 1, wherein:
   the support member is arranged so that a longitudinal direction thereof extends along a direction of shifting of the scale.

5. A displacement detection device according to claim 1, wherein:
   the pressure application member applies the pressure substantially in a center of the contact position of the displacement detection section.

6. A displacement detection device according to claim 1, wherein:
   a portion of the scale which contacts with the displacement detection section is a tube surface, and
   the support member is provided on the contact plane or in the vicinity of the contact plane, and is arranged substantially parallel with the contact plane.

7. A displacement detection device according to claim 1, wherein:
   the support member comprises a rigidity reduction section at a portion of the support member which bends when the displacement detection section shifts in the direction substantially perpendicular to the contact plane.

8. A displacement detection device according to claim 7, wherein:
   the rigidity reduction section is provided in the vicinity of a substantial center of the support member.

9. A displacement detection device according to claim 7, wherein:
   the rigidity reduction section is a hole portion which is provided in the support member.

10. A displacement detection device according to claim 1, wherein:
    the pressure application member does not apply force to the displacement detection section and does not restrict a position of the displacement detection section in a direction other than a pressure application direction in which the pressure application member applies the pressure to the displacement detection section towards the scale.

11. A displacement detection device according to claim 1, wherein:
the pressure application member is arranged so that a longitudinal direction thereof extends along a direction of shifting of the scale.

12. A displacement detection device according to claim 1, wherein:
the scale is a magnetic scale whose different magnetic polarities are arranged alternatingly along a shifting direction, and
the displacement detection section comprises a magnetoresistive sensor that detects a magnetism of the magnetic scale.

13. A displacement detection device according to claim 12, wherein:
the displacement detection section includes a gap regulation member that regulates a gap between the magnetoresistive sensor and the magnetic scale, and
the gap regulation member is provided on a side of the magnetoresistive sensor which faces the magnetic scale.

14. A displacement detection device according to claim 1, wherein:
the displacement detection section comprises a convex portion at a portion thereof to which the pressure is applied by the pressure application member.

15. A lens barrel, comprising:
a photographic optical system;
a fixed member that is to be fitted to a photographic device main body; and
a displacement detection device which detects a displacement of a movable member which is provided so as to be displaceable with respect to a fixed member, that comprises (a) a scale that is provided as a unit with the movable member; (b) a displacement detection section that detects a displacement of the scale; (c) a support member that supports the displacement detection section in a state in which the displacement detection section is able to shift in a direction which is substantially perpendicular to a contact plane where the displacement detection section contacts with the scale at a contact position between the displacement detection section and the scale and in which shifting in a direction other than the direction substantially perpendicular to the contact plane is restricted; and (d) a pressure application member that applies a pressure to the displacement detection section towards the scale, wherein:
the displacement detection device detects a displacement of the movable member that rotates with respect to the fixed member to drive at least a portion of the photographic optical system.

16. A camera comprising:
a camera main body, and
a lens barrel that comprises;
a photographic optical system,
a fixed member that is to be fitted to a photographic device main body, and
a displacement detection device which detects a displacement of a movable member which is provided so as to be displaceable with respect to a fixed member, that comprises (a) a scale that is provided as a unit with the movable member; (b) a displacement detection section that detects a displacement of the scale; (c) a support member that supports the displacement detection section in a state in which the displacement detection section is able to shift in a direction which is substantially perpendicular to a contact plane where the displacement detection section contacts with the scale at a contact position between the displacement detection section and the scale and in which shifting in a direction other than the direction substantially perpendicular to the contact plane is restricted; and (d) a pressure application member that applies a pressure to the displacement detection section towards the scale, wherein
the displacement detection device detects a displacement of the movable member that rotates with respect to the fixed member to drive at least a portion of the photographic optical system.

17. A displacement detection method that detects a displacement of a movable member relative to a fixed member, the method comprising the steps of:
mounting a scale on the movable member;
providing a detector that is capable of contacting the scale to detect a displacement of the scale;
supporting the detector by a supporting member, the supporting member movably supporting the detector in a first direction substantially perpendicular to a contact plane where the detector contacts with the scale at a contact position and restricting a movement of the detector in a second direction other than the first direction; and
applying a pressure to the detector toward the scale.

* * * * *